United States Patent [19]
Farmos

[11] Patent Number: 6,113,510
[45] Date of Patent: Sep. 5, 2000

[54] PROPULSION APPARATUS

[76] Inventor: George T. Farmos, 5733 Crestmont Ave., Livermore, Calif. 94550

[21] Appl. No.: 09/198,916

[22] Filed: Nov. 24, 1998

Related U.S. Application Data

[63] Continuation-in-part of application No. 09/149,768, Sep. 8, 1998.

[51] Int. Cl.[7] .............................. F16H 55/30; B62M 1/04
[52] U.S. Cl. .......................... 474/160; 474/152; 280/252; 280/255
[58] Field of Search ...................................... 474/152, 156, 474/159, 140, 146, 147, 206, 160; 280/252, 251, 253, 256, 255, 257, 254

[56] References Cited

U.S. PATENT DOCUMENTS

| | | | |
|---|---|---|---|
| 3,132,877 | 5/1964 | Pontin ...................................... | 280/257 |
| 3,891,235 | 6/1975 | Shelly ...................................... | 280/252 |
| 4,169,609 | 10/1979 | Zampedro ............................. | 280/252 X |
| 5,104,137 | 4/1992 | Kilts ......................................... | 280/255 |
| 5,236,211 | 8/1993 | Meguerditchian ................... | 280/252 X |
| 5,496,051 | 3/1996 | Farmos ................................... | 280/252 |
| 5,690,345 | 11/1997 | Kiser ...................................... | 474/160 X |

*Primary Examiner*—David A. Bucci
*Assistant Examiner*—Marcus Charles
*Attorney, Agent, or Firm*—Thomas R. Lampe

[57] ABSTRACT

Manually powered propulsion apparatus for a cycle includes first and second pedals interconnected by an endless elongated flexible member. Drive elements are affixed to the flexible member which engage drive elements on two crank members employed to apply torque to the drive wheel of the cycle. The crank members rotate during rotation of the flexible member.

13 Claims, 6 Drawing Sheets

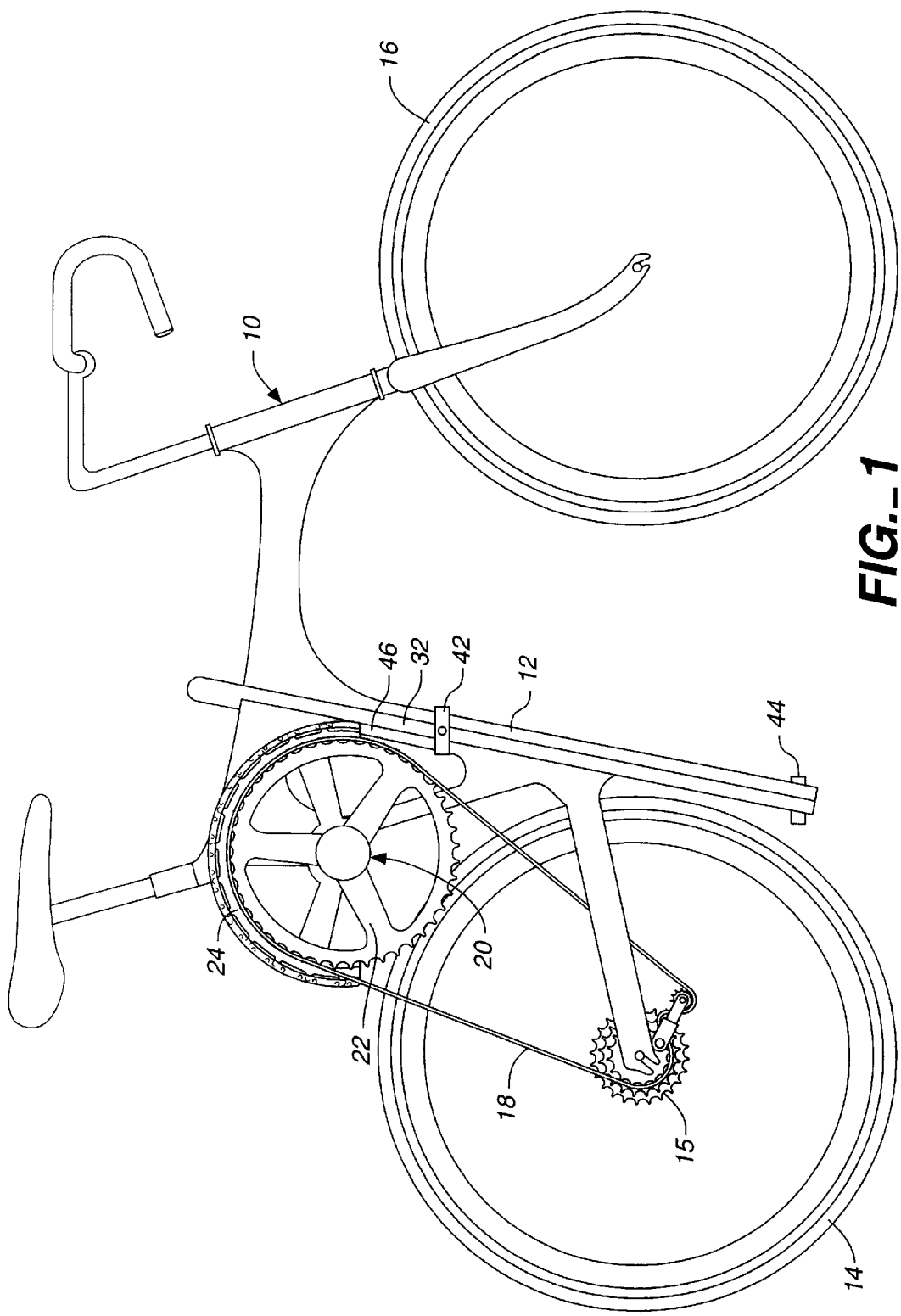
FIG._1

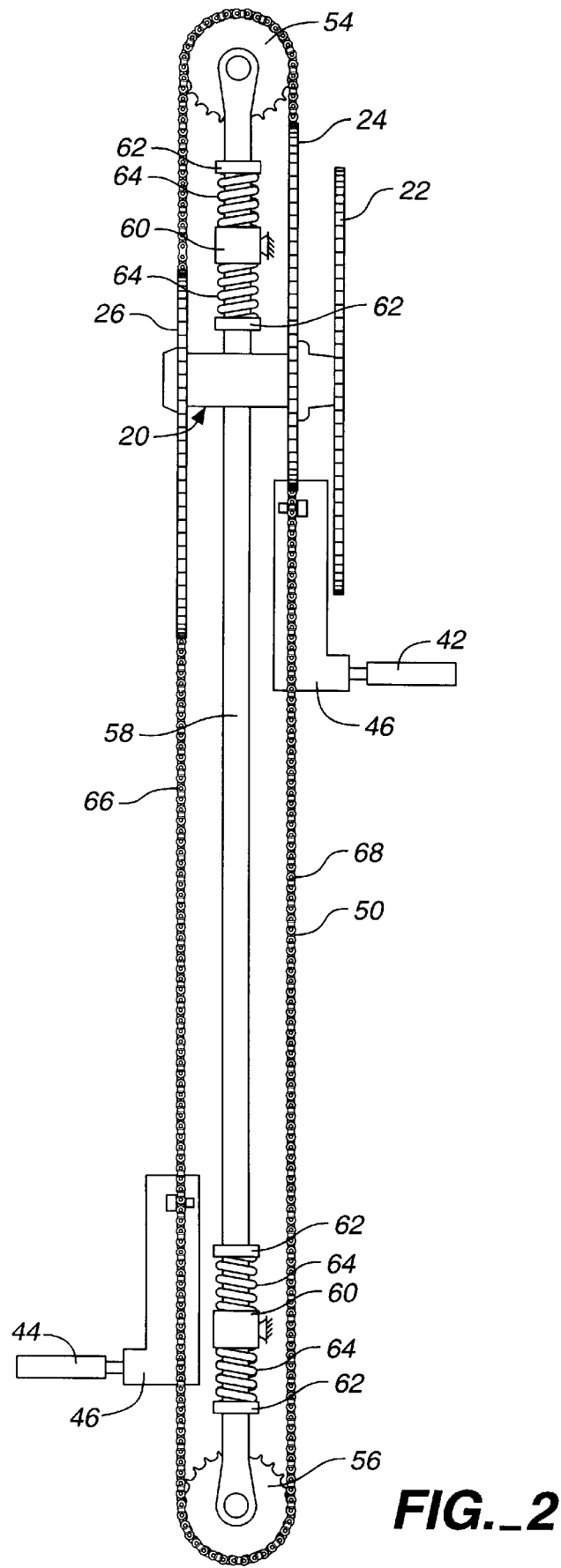
FIG._2

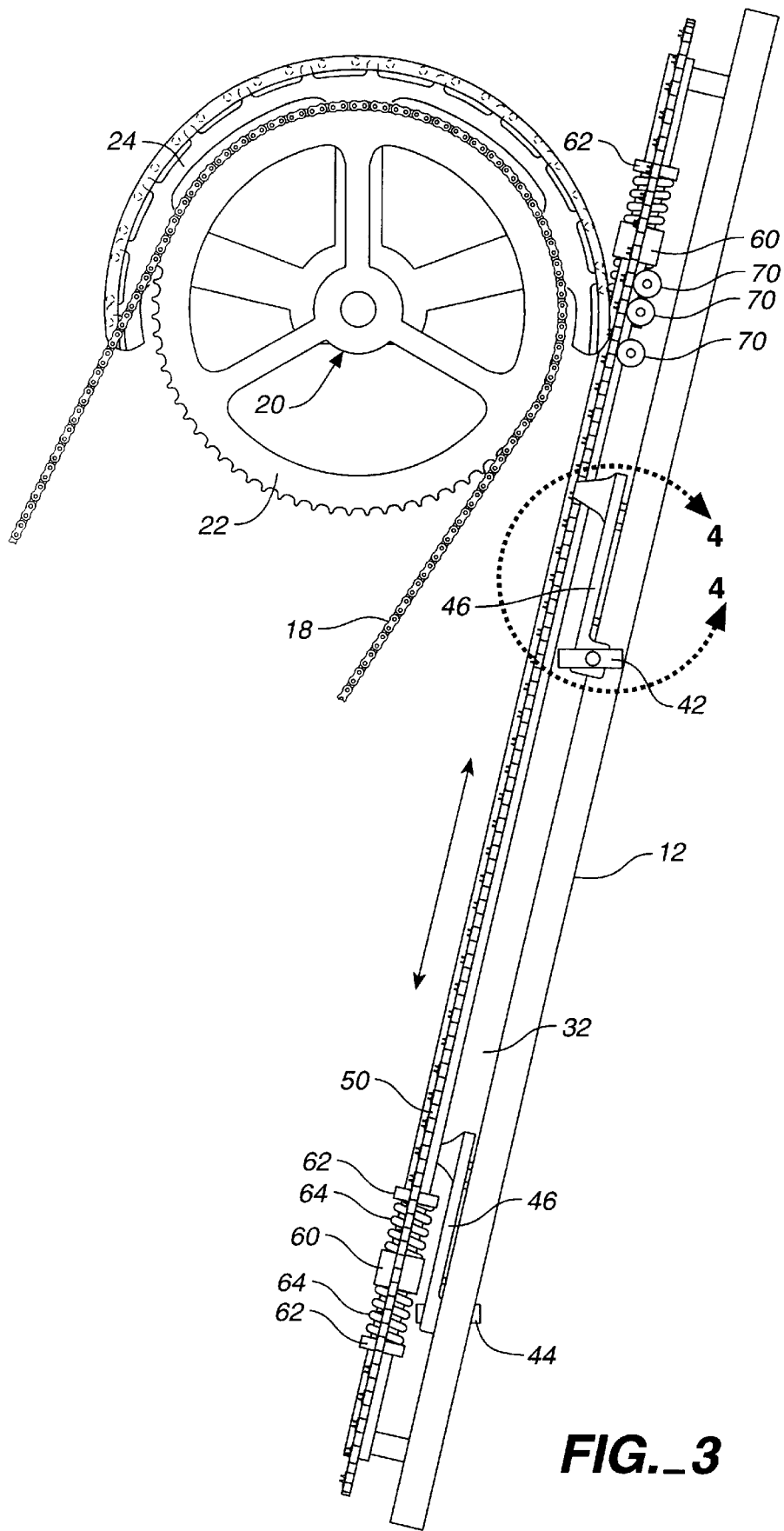
FIG._3

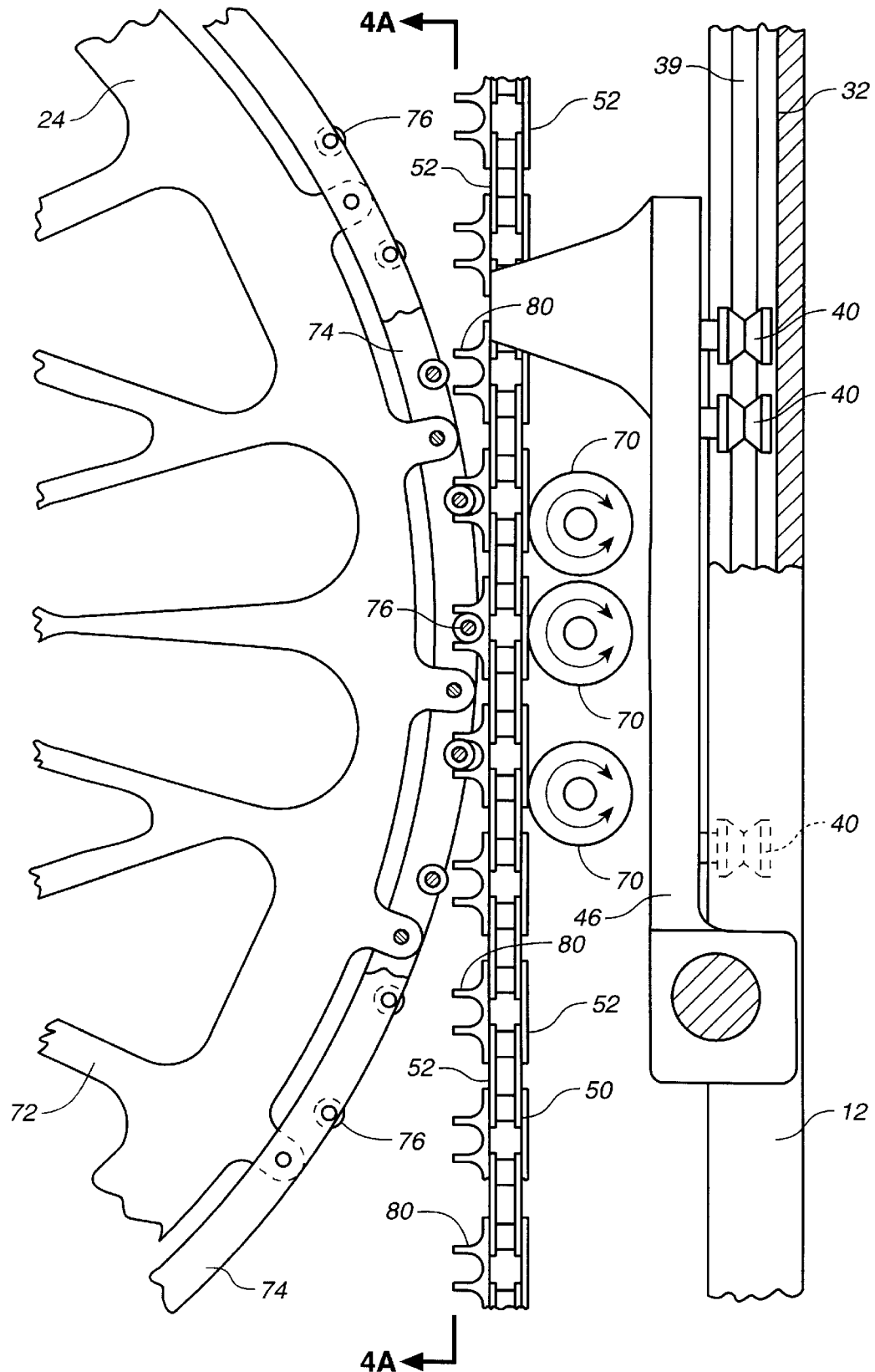
FIG._4

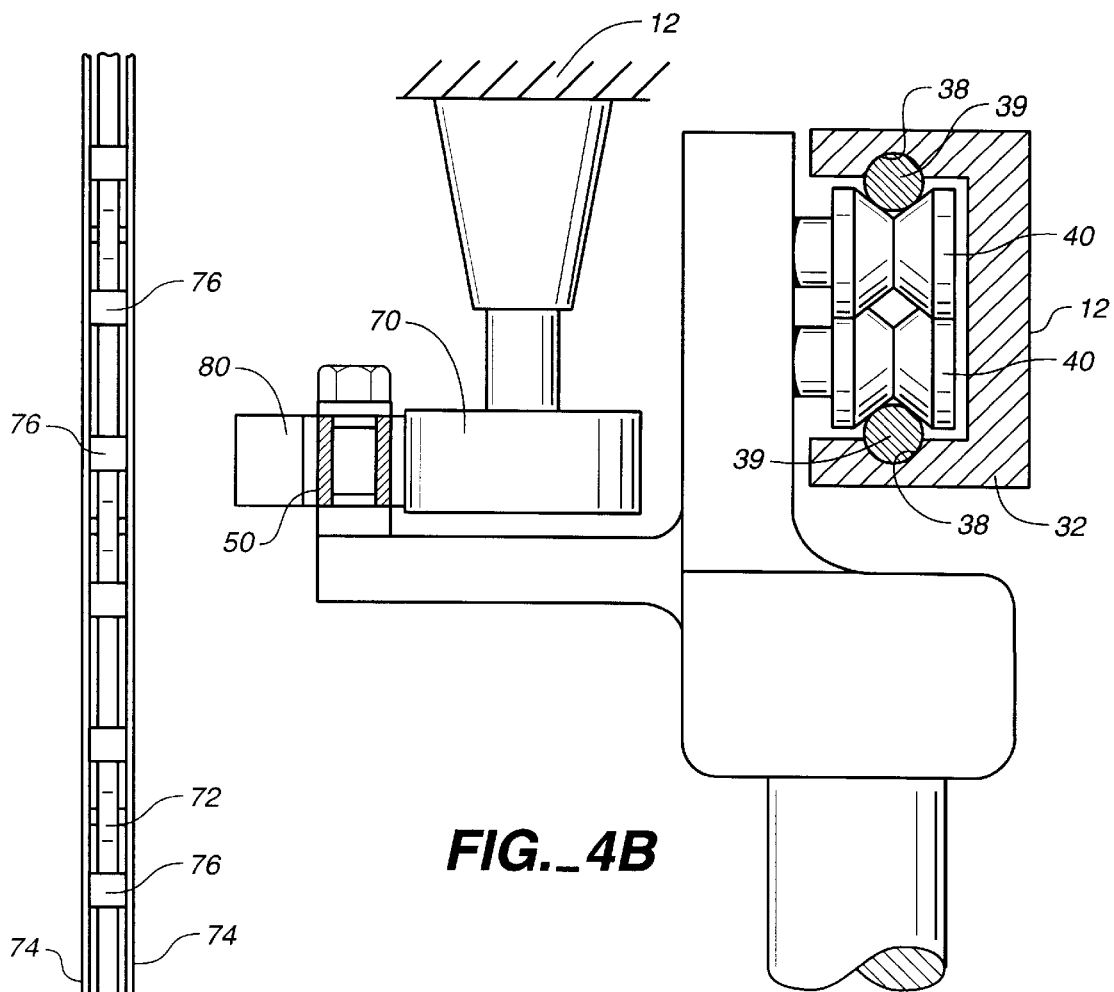
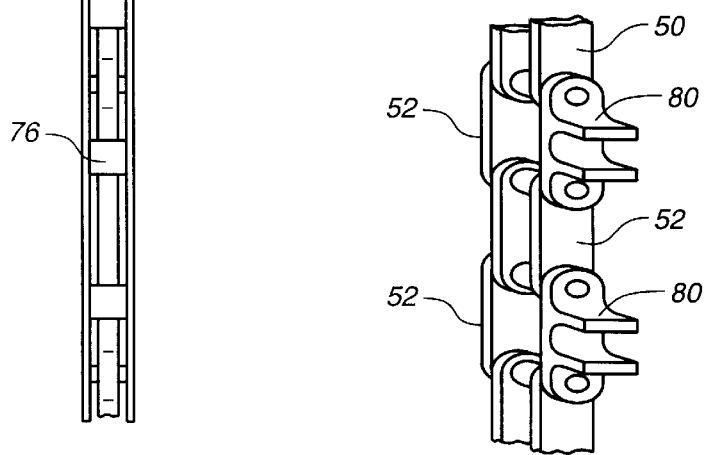
FIG._4A
FIG._4B
FIG._4C

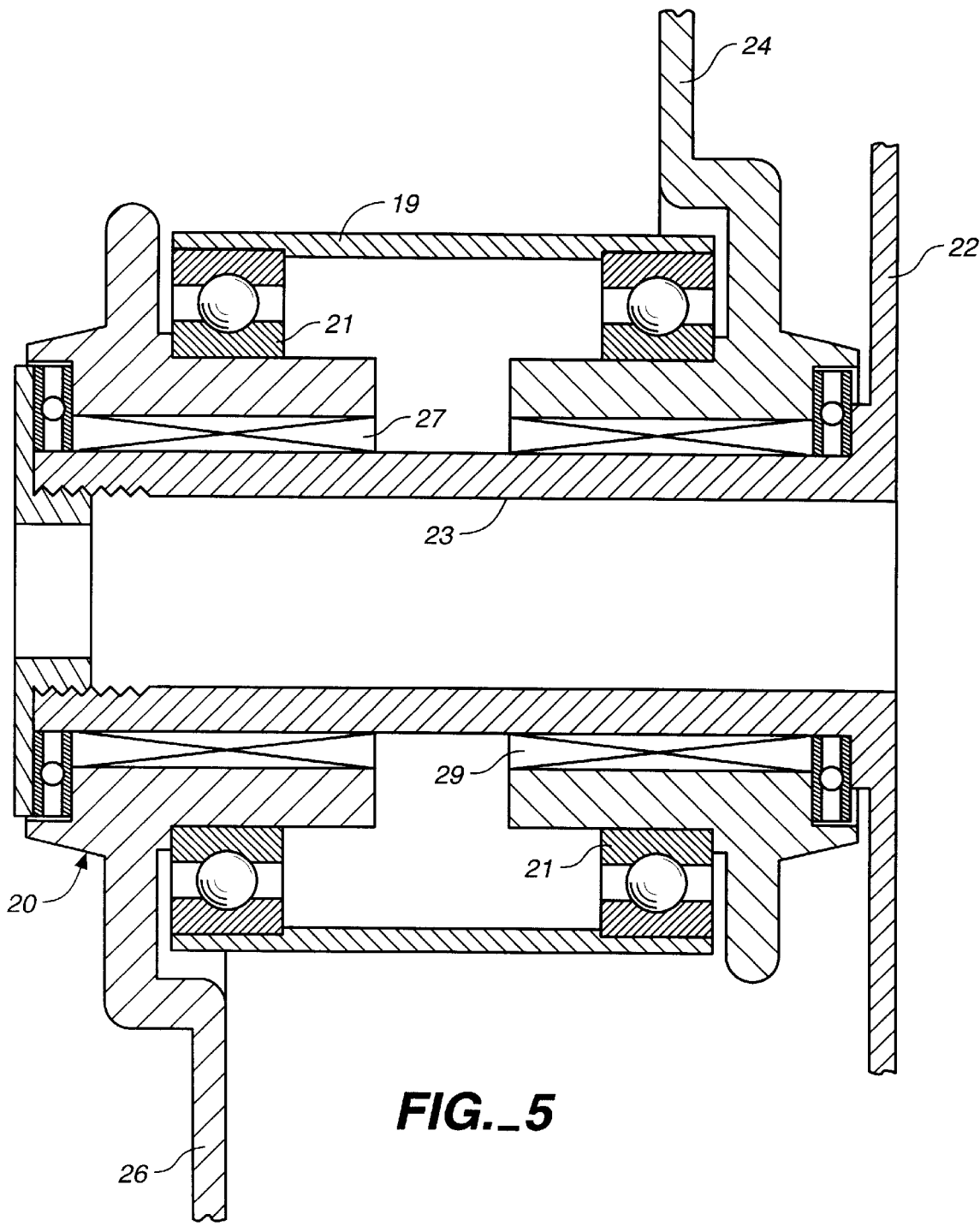
FIG._5

PROPULSION APPARATUS

PROPULSION APPARATUS

This application is a continuation-in-part of my U.S. patent application Ser. No. 09/149,768, filed Sep. 8, 1998.

TECHNICAL FIELD

This invention relates to manually powered propulsion apparatus. The invention has particular applicability to manually-powered cycles such as bicycles. With respect to the latter, the apparatus propels a bicycle through force exerted by a rider on pedals incorporated in the apparatus.

BACKGROUND OF THE INVENTION

Many propulsion and transmission systems are known in the prior art for use with bicycles and other manually-powered cycles such as exercycles. Most commonly, the cycle is propelled or operated by foot pedals which are connected through suitable transmission means to one or more of the cycle wheels, the pedals rotating about a central axis passing through the cycle frame along a circular path of movement about the axis when pumped by the rider.

My U.S. Pat. No. 5,496,051, issued Mar. 5, 1996, discloses apparatus for propelling a manually-powered cycle including first and second pedals which move along spaced, linear paths of movement. The pedals are connected to the drive wheel of the cycle through a power train including elongated flexible transmission elements which wrap about rotatable crank members used to drive the cycle.

My U.S. patent application Ser. No. 09/149,768, filed Sep. 8, 1998, discloses a manually-powered propulsion apparatus including a flexible transmission member having pivotally interconnected link members which cooperate to form a curved, self supporting structure between a rotatable member of the apparatus and a pedal when the pedal moves from extended to retracted position.

DISCLOSURE OF INVENTION

The present invention also relates to manually-powered propulsion apparatus which may be employed to power a cycle wherein the pedals are operatively connected to the drive wheel of the cycle. However, a number of differences exist between the apparatus of the present invention and those of U.S. Pat. No. 5,496,051 and the pending application referenced above. The apparatus of the present invention is characterized by its simplicity of construction, reliability and ease of operation.

The manually-powered propulsion apparatus of the present invention includes first and second pedals and pedal guide means. Mounting means mounts the pedals on the pedal guide means for reciprocating movement of the pedals between retracted and extended pedal positions.

The apparatus also includes a first rotatable crank member and a second rotatable crank member mounted on a cycle frame along with a rotatable driver member.

Pedal interconnecting means interconnects the first and second pedals and is operable to move one of the pedals to the retracted position thereof from the extended position thereof when the other of the pedals is depressed by a force applied thereto and moved to the extended position thereof from the retracted position thereof.

Transmission means is operatively associated with the first and second pedals and the first and second rotatable crank members to transfer power alternatively from the first and second pedals through the first and second crank members to the rotatable driver member for imparting torque to the rotatable driver member responsive to alternate depression of the pedals along the pedal guide means from the retracted positions thereof to the extended positions thereof.

The transmission means includes crank member engagement means attached to the pedal interconnecting means and in engagement with the crank members for rotating the crank members during movement of the pedal interconnecting means.

Other features, advantages, and objects of the present invention will become apparent with reference to the following description and accompanying drawings.

BRIEF DESCRIPTION OF DRAWINGS

FIG. 1 is a side view of a bicycle illustrating selected structural elements of apparatus constructed in accordance with the teachings of the present invention;

FIG. 2 is a schematic rear view illustrating selected structural components of the apparatus;

FIG. 3 is a partial side view illustrating selected components of the apparatus;

FIG. 4 is a greatly enlarged elevational view illustrating a chain, a pedal mount affixed to the chain and related structure, including interconnecting drive elements on the chain and a rotatable crank member in the area delineated by double headed arrow 4—4 in FIG. 3;

FIG. 4A is a view taken along the line 4A—4A in FIG. 4, portions of selected components broken away or in partial cross section;

FIG. 4B is an enlarged plan view in partial section illustrating structural details of the pedal mount, guide channel and related structure;

FIG. 4C is a greatly enlarged perspective view of a segment of a chain and associated drive elements employed in the apparatus; and FIG. 5 is an enlarged cross-sectional view illustrating in diagrammatic format structure including a clutch and bearing assembly employed in the apparatus.

BEST MODE FOR CARRYING OUT THE INVENTION

Referring now to the drawings, a bicycle 10 incorporating apparatus of the present invention includes a frame 12 and wheels 14, 16. Wheel 14 is driven by a chain 18 connected to a conventional multi-sprocket gear assembly 15.

Connected to frame 12 by any suitable means is an assembly 20. Assembly 20 includes a housing 19 and bearings 21 (see FIG. 5). Rotatably journaled within housing 19 and bearings 21 is a sprocket shaft 23. A rotatable drive sprocket or driver member 22 is affixed to sprocket shaft 23 and extends adjacent to and outwardly of the housing 19. Drive sprocket or driver member 22 is of circular configuration and has teeth about the outer periphery thereof which engage chain 18. Member 22 is rotatable to drive the wheel 14 through the intermediate chain 18.

Located near the opposed ends of the assembly 20 are a first rotatable crank member 24 and a second rotatable crank member 26, the crank members being coaxial with the sprocket shaft 23. In the interest of clarity, only crank member 24 is shown in FIG. 1, however, as viewed in FIG. 1, clockwise rotation of either first rotatable crank member 24 or second rotatable crank member 26 will result in rotation of the driver member 22, the chain 18 and the wheel 14.

Referring once again to FIG. 5, crank members 24 and 26 are journaled on clutch and bearing assemblies 27, 29, respectively. The clutch and bearing assemblies can be of conventional construction and are illustrated diagrammatically. Rotation of the respective crank members 24, 26 clockwise (as viewed in FIG. 1) will cause rotation of sprocket shaft 23 and driver member 22 through the one-way clutches of assemblies 27, 29. However, the one-way clutches will allow ready counter-clockwise rotation of the crank members 24 and 26 without affecting movement of the sprocket shaft and driver member.

Frame 12 of the bicycle includes two parallel frame members 32 which are in the form of channels defining interiors or trackways 36. In the interest of simplicity and clarity, only one such frame member 32 is illustrated, however it is to be understood that the other frame member 32 is of identical construction, the only difference being that it is located on the other side of the frame from that illustrated. My U.S. Pat. No. 5,496,051 may be referred to for a teaching of the concept of employing two trackways disposed side-by-side to guide movement of two pedals of a cycle propulsion mechanism and the teachings of such patent are incorporated herein by reference.

In the embodiment illustrated each frame member (see FIGS. 4 and 4B) has parallel recesses 38 formed therein and extending the length thereof. Recesses 28 accommodate elongated rod-like members 39 formed of hard material such as steel or other suitable low friction material which will function as guides in the trackway for rollers 40 operatively associated with pedals employed in the apparatus in a manner which will now be described.

Rollers 40 comprise portions of the mounting means employed to mount pedals 42, 44 to the rest of the apparatus. Pedals 42, 44 are connected to and project from the two pedal mount members 46, the pedals being rotatable on pedal mounting shafts 48 of the mount members. The rollers 40 allow the pedal mount members and pedals to freely move up and down along the trackways 36 of frame members 32.

Connected to each pedal through its associated pedal mount member is an elongated flexible member 50 which in the disclosed embodiment is an endless chain comprised of a plurality of pivotally interconnected chain link elements 52. In the interest of simplicity and clarity, chain 50 and other structure operatively associated therewith which will now be described have not been illustrated in FIG. 1. However, reference may be had to FIGS. 2 through 4C in connection with the following description.

Chain 50 forms a continuous loop about roller elements 54, 56. The roller elements are freely rotatably attached to opposed ends of a shaft 58. Shaft 58 passes through two bushings 60 which are in turn affixed to frame 12 of the bicycle in any suitable fashion. Flanges 62 are fixedly secured to shaft 58 on both sides of each bushing 60, as shown in FIGS. 2 and 3. Four coil compression springs 64 are disposed between each flange 62 and its associated bushing 60.

Chain 50 includes straight chain segments 66, 68. One of the pedal mount members 46 is affixed to chain segment 66 and the other affixed to chain segment 68. Depression of pedal 42 will cause clockwise rotation of chain 50 (as viewed in FIG. 2) and upward movement of pedal 44 and its associated mount member 46 to elevated or retracted position. Depression of the raised pedal 44 will similarly cause pedal 42 to return to its raised or retracted position due to rotation of the chain 50 in a counter clockwise direction as viewed in FIG. 2. The pedals move along parallel linear paths of movement. Springs 64 bias the shaft 58 toward a predetermined location relative to the frame 12 of the bicycle. Roller elements 54, 56 exert opposed forces on chain 50, the opposed forces being along an axis substantially parallel to the linear paths of movement of the pedals and associated mounting members. The chain segments 66, 68 are parallel to one another and to the linear paths of movement of the pedals and pedal mounts. The loop formed by chain 50 is movable and displaceable as a unit along with shaft 58 relative to the frame 12 along the axis of the opposed forces exerted on chain 50 by the roller elements responsive to forces applied to the pedals. This is for the purpose of absorbing shock applied to the chain caused by alternate depression of the pedals and a smooth transition between the pedals during operation of the apparatus is promoted thereby.

Chain segments 66, 68 pass through a gap formed between rotatable crank members 24, 26 and guide or backing rollers 70 rotatably mounted on frame 12. Each crank member includes a crank member body 72 having attached thereto at the outer periphery thereof by any suitable expedient spaced side plates 74.

Extending between side plates 74 and rotatably mounted thereon are double-ended stub shafts or rollers 76. As may perhaps best be seen with reference to FIG. 4, the stub shafts or rollers 76 are received in receptacles 80 affixed to chain 50 at spaced locations thereon. Some of the stub shafts 76 are always received in some of the receptacles. Thus, movement of chain 50 in either a clockwise or counter-clockwise direction will cause rotation of the crank members 24, 26. One crank member will rotate clockwise during movement of the chain and the other counter-clockwise, it being apparent that the direction of rotation of a particular crank member will depend upon the direction of movement of the chain segment to which it is releasably connected.

Depression of each pedal will thus cause rotation of the crank members which in turn cause rotation of driver member 22 of the bicycle to propel same. At the same time, chain 50 will operate to move a non-depressed pedal to its upper or retracted position. This operational cycle is repeated over and over again while the bicycle is being propelled.

What is claimed is:

1. Manually powered propulsion apparatus for propelling a cycle having a cycle frame, said propulsion apparatus comprising, in combination:

a first pedal;

a second pedal;

pedal guide means comprising spaced first and second tracks mounted on said frame;

mounting means mounting said first and second pedals on said pedal guide means for reciprocating movement of said first and second pedals between retracted and extended pedal positions, said mounting means comprising a first mount attached to and supporting said first pedal and movable along said first track and a second mount attached to and supporting said second pedal and movable along said second track;

a first rotatable crank member rotatably mounted on said frame;

a second rotatable crank member rotatably mounted on said frame;

a rotatable driver member connected to said first and second crank members and rotatably mounted on said frame;

transmission means operatively associated with said first and second pedals and said first and second rotatable crank members to transfer power alternatively from said first and second pedals through said first and second crank members to said rotatable driver member for imparting torque to said rotatable driver member responsive to alternate depression of said pedals along the pedal guide means from the retracted positions thereof to the extended positions thereof; and pedal interconnecting means movably mounted on said frame interconnecting said first and second pedals and operable to move one of said pedals to the retracted position thereof from the extended position thereof when the other of the pedals is depressed by a force applied thereto and moves to the extended position thereof from the retracted position thereof, said transmission means including crank member engagement means attached to said pedal interconnecting means and in engagement with said crank members for rotating said crank members during movement of the pedal interconnecting means, each of the crank members including spaced first drive elements, said crank member engagement means comprising spaced second drive element attached to said pedal interconnecting means for engaging said first drive elements.

2. The propulsion apparatus according to claim 1 wherein at least some of either said first or second drive elements comprise receptacles for releasably receiving other of said first or second drive elements.

3. The propulsion apparatus according to claim 1 wherein said pedal interconnecting means comprises a flexible member forming a continuous loop, said first and second mounts being affixed to said flexible member at spaced locations on said flexible member.

4. The propulsion apparatus according to claim 3 additionally comprising means engaging said flexible member and urging said flexible member toward said crank members to promote engagement between said first drive elements and said second drive elements.

5. The propulsion apparatus according to claim 1 wherein each of the crank members includes a crank member body and spaced side plates attached to said crank member body, said fist drive elements extending between and connected to said spaced side plates.

6. The propulsion apparatus according to claim 5 wherein said first drive elements comprise double-ended shafts, the ends of said shafts being rotatably mounted on said side plates.

7. The propulsion apparatus according to claim 3 additionally comprising support means supporting said flexible member on said frame for rotation of the loop formed by the flexible member relative to said frame responsive to depression of a pedal, the direction of rotation of the loop formed by the flexible member resulting from depression of said first pedal being opposite the direction of rotation of the loop formed by the flexible member resulting from depression of said second pedal.

8. The propulsion apparatus according to claim 7 wherein said support means includes a first roller element and a second roller element spaced from said first roller element, said flexible member extending about portions of said first and second roller elements at ends of the loop formed by the flexible member.

9. The propulsion apparatus according to claim 1 additionally comprising roller element mounting means mounted on said frame and movable relative to said frame, said first and second roller elements being rotatably mounted on said roller element mounting means at spaced locations thereon.

10. The propulsion apparatus according to claim 9 additionally comprising biasing means operatively associated with said roller element mounting means biasing said roller element mounting means toward a predetermined location relative to said frame.

11. The propulsion apparatus according to claim 8 wherein said first and second roller elements exert opposed forces on the flexible member, the pedals moving along parallel linear paths of movement, and said opposed forces being along an axis substantially parallel to said linear paths of movement.

12. The propulsion apparatus according to claim 11 wherein the loop formed by said flexible member includes two loop segments substantially parallel to one another and to said linear paths of movement.

13. The propulsion apparatus according to claim 11 wherein the loop formed by the flexible member is movable and displaceable as a unit relative to said frame along said axis responsive to forces applied to the pedals for absorbing shock applied to said flexible member caused by alternate depression of the pedals and promoting a smooth transition between the pedals during operation of said apparatus.

* * * * *